(12) United States Patent
Walker, Jr.

(10) Patent No.: US 8,485,502 B2
(45) Date of Patent: Jul. 16, 2013

(54) ELECTRIC FENCE POWER CONTROL FOR TEMPORARY INTERRUPTIONS

(76) Inventor: Jack E. Walker, Jr., Waycross, GA (US)

( * ) Notice: Subject to any disclaimer, the term of this patent is extended or adjusted under 35 U.S.C. 154(b) by 677 days.

(21) Appl. No.: 12/714,539

(22) Filed: Feb. 28, 2010

(65) Prior Publication Data

US 2011/0198548 A1 Aug. 18, 2011

Related U.S. Application Data

(60) Provisional application No. 61/305,286, filed on Feb. 17, 2010.

(51) Int. Cl.
*A01K 3/00* (2006.01)

(52) U.S. Cl.
USPC .................................. 256/10; 49/59

(58) Field of Classification Search
USPC ................................. 256/10; 49/59
See application file for complete search history.

(56) References Cited

U.S. PATENT DOCUMENTS

| | | | | |
|---|---|---|---|---|
| 1,976,721 | A * | 10/1934 | Gengler | 256/10 |
| RE19,922 | E * | 4/1936 | Gengler | 256/10 |
| 2,306,661 | A | 12/1942 | Gengler | |
| 2,454,348 | A | 11/1948 | Schilling | |
| 2,476,233 | A | 7/1949 | Wood | |
| 2,540,562 | A | 2/1951 | Wood | |
| 2,546,429 | A * | 3/1951 | Carr | 256/10 |
| 2,605,565 | A | 8/1952 | Meyer, Jr. | |
| 2,796,485 | A * | 6/1957 | Durkee | 256/10 |
| 3,293,800 | A * | 12/1966 | Martinmaas | 49/59 |
| 3,516,643 | A | 6/1970 | Cox | |
| 3,684,248 | A * | 8/1972 | Maes, Jr. | 256/10 |
| 3,756,566 | A * | 9/1973 | Bangs | 256/10 |
| 4,040,604 | A | 8/1977 | Langlie et al. | |
| 4,090,472 | A * | 5/1978 | York | 256/10 |
| 4,196,890 | A * | 4/1980 | Einhorn | 256/10 |
| 4,493,480 | A | 1/1985 | Nichol | |
| 4,511,771 | A | 4/1985 | Rossell | |
| 5,072,915 | A * | 12/1991 | Shirley | 256/10 |
| 5,338,007 | A | 8/1994 | Hinton | |
| 6,257,558 | B1 * | 7/2001 | Levine et al. | 256/10 |
| 6,712,339 | B1 * | 3/2004 | Smith | 256/10 |
| 8,120,212 | B2 * | 2/2012 | Hamm et al. | 256/10 |

(Continued)

FOREIGN PATENT DOCUMENTS

| | | |
|---|---|---|
| GB | 2443695 | 11/2006 |
| SE | 525074 | 11/2004 |
| WO | WO9624827 A1 | 5/1996 |

*Primary Examiner* — Victor MacArthur
(74) *Attorney, Agent, or Firm* — Christopher Wood; Premier Law Group, PLLC

(57) ABSTRACT

A mounting arrangement for mounting exposed filamentary electrical conductors on fences intended for conversion to electrified fences. The arrangement provides fence engaging panels for mounting, which panels include electrical contacts. The panels may include posts having grooves for tying a filamentary conductor to the panel independently of connection to an electrical contact. The panels may be fastened by fasteners which resemble ratchet action cable ties, and which are formed integrally with the collars. Holes are formed in the panels to accept fasteners such as screws. Collars may be arcuate members, planar panel members, or may comprise a plurality of planar panels hinged to one another. Collars and associated contacts may be installed in numbers and mounting arrangements assuring two pole break for each otherwise energized conductors where those conductors span a gate, thereby fully de-energizing the gate automatically when opened, and automatically re-establishing electrical continuity when the gate is closed.

4 Claims, 13 Drawing Sheets

U.S. PATENT DOCUMENTS

2006/0186393 A1 8/2006 Santelli
2007/0284562 A1* 12/2007 Bunk et al. ................ 256/10
2009/0032790 A1* 2/2009 Timms .......................... 256/10
2011/0198548 A1* 8/2011 Walker, Jr. .................... 256/10

* cited by examiner

| TABLE | |
|---|---|
| Part # | Description |
| C | center line, Figure 1 |
| C1 | center line, Figure 6 |
| C2 | center line, Figure 7 |
| G | ground, Figure 9 |
| P | fence post, Figure 4 |
| 100 | collar, Figure 1 |
| 120 | inside surface |
| 140 | outside surface |
| 160 | electrically conductive contact |
| 180 | enlarged head |
| 200 | shaft |
| 220 | arrow |
| 240 | conductor tower |
| 260 | circumferential groove |
| 280 | fastener |
| 300 | fastener |
| 320 | head |
| 340 | first edge |
| 360 | second edge |
| 400 | collar, Figure 2 |
| 420 | electrically conductive contact |
| 440 | conductor tower |
| 460 | contact support tower |
| 480 | bore |
| 500 | shaft |
| 520 | coil spring |
| 540 | inside of collar 400 |
| 560 | section of collar 400 |
| 580 | section of collar 400 |
| 600 | section of collar 400 |

Fig. 11A

| TABLE (continued) | |
|---|---|
| 610 | hole for receiving fastener |
| 620 | interior surface of section 560 |
| 640 | live hinge |
| 660 | tie cable end |
| 680 | tie cable end |
| 700 | collar, Figure 3 |
| 720 | electrically conductive contact |
| 740 | arrow |
| 760 | elongated tab |
| 780 | first hole in elongated tab 760 |
| 800 | second hole in elongated tab 760 |
| 820 | base |
| 840 | retention head |
| 860 | slot formed in elongated tab 760 |
| 880 | circle, Figure 4 |
| 900 | center |
| 920 | longitudinal center line |
| 940 | spring |
| 1000 | collar, Figure 8 |
| 1005 | contact |
| 1010 | retention head |
| 1020 | section of collar 1000 |
| 1025 | flexible tether |
| 1040 | section of collar 1000 |
| 1060 | section of collar 1000 |
| 1080 | fastener |
| 1100 | fastener |
| 1120 | conductor tower |
| 1140 | electrically conductive contact |
| 1160 | chain link fence, Figure 9 |
| 1180 | fence post |
| 1200 | fence post |

*Fig. 11B*

| TABLE (continued) | |
|---|---|
| 1220 | gate post |
| 1240 | gate post |
| 1260 | barrier element |
| 1280 | barrier element |
| 1300 | gate |
| 1320 | longitudinal axis |
| 1340 | filamentary conductor |
| 1360 | filamentary conductor |
| 1380 | filamentary conductor |
| 1400 | collar, Figure 9 |
| 1420 | conductor tower |
| 1440 | electrically conductive contact |
| 1460 | hole |
| 1480 | collar, Figure 9 |
| 1500 | collar, Figure 9 |
| 1520 | collar, Figure 9 |
| 1540 | filamentary conductor |
| 1560 | filamentary conductor |
| 1580 | filamentary conductor |
| 1600 | collar, Figure 9 |
| 1620 | collar, Figure 9 |
| 1640 | collar, Figure 9 |
| 1660 | collar, Figure 9 |
| 1680 | electrically conductive contact |
| 1700 | gap |
| 1720 | electrically conductive contact |
| 1740 | electrically conductive contact |
| 1760 | electrically conductive contact |
| 1780 | electrically conductive contact |
| 1800 | electrically conductive contact |
| 1820 | electrically conductive contact |

Fig. 11C

ELECTRIC FENCE POWER CONTROL FOR TEMPORARY INTERRUPTIONS

CROSS-REFERENCE TO RELATED APPLICATIONS

This application claims the benefit of priority from U.S. Provisional Patent Application Ser. No. 61/305,286 (filed Feb. 17, 2010). The entire content of Provisional Patent Application Ser. No. 61/305,286 is incorporated herein by reference in its entirety.

STATEMENT REGARDING FEDERALLY SPONSORED RESEARCH OR DEVELOPMENT

Not applicable.

BACKGROUND OF THE INVENTION

Electric or electrified fences are used to deter unauthorized entry into or egress from a fenced area. Electrical shock or the threat of electrical shock is both actually present and also is made known. One primary purpose of electric fences is to keep livestock such as cattle or domestic pets such as dogs safely contained within a particular area or enclosure and to discourage entry of predator animals. The animals become conditioned to the electrified conditions and will not stray past the fence. Predators may become similarly conditioned.

Fenced areas must occasionally be entered by authorized personnel, who will typically enter the fenced area through a gate. Potentially hazardous conditions must be modified to accommodate passage of the personnel through a gate. Notably, power must be temporarily discontinued while the gate is open.

To assure effectiveness of the electric fence, power must be restored when the gate is closed.

Prior developments in electric fences have generally been directed to facilities for livestock such as cattle and horses. The apparatus developed for such electric fences generally offer limited versatility at best regarding where an electrified conductor is to be placed on a fence, in terms of height above ground. Existing apparatus for accommodating passage through electrified gates have been centered around the concept of single pole breaking of an energized conductor. This situation may leave portions of conductors disposed on gates energized, which may be hazardous to personnel.

The field of apparatus for mounting electrical conductors to and managing interruptions such as gate openings leaves room for improvements.

SUMMARY OF THE INVENTION

The present invention improves upon apparatus for electrifying fences, and is particularly suitable for retrofitting non-electric fences with exposed filamentary conductors to convert the fence to an electrified fence. To this end, the invention provides components which are readily mounted to fence posts, and which provide a switching function, a support function for supporting an exposed wire or filamentary conductor along the fence, or both.

It is contemplated that the most universally utilized component of the novel apparatus is a conductor mount for supporting a movable electrical contact, thereby satisfying the switching function. Generally speaking, there are two forms of contacts. One is contacts which move in a radial path relative to the fence post, which path would intersect the center of the fence post to which their respective conductor mounts are fastened. The other is contacts which move in a path which is generally tangential to the fence post. The two types of contacts offer versatility in allowing for operative switching action wherever there is a break in continuity of the exposed conductor, such as at gates which must be opened. The problem that must typically be addressed at breaks is to assure that the movable contact of one conductor mount successfully aligns with and comes to contact the movable contact of an adjacent conductor mount. In practice, due to gate styles, gaps between stationary fence posts and gates, fence posts which are not vertical, and other disruptive influences, some adjustment is necessary to assure that contacts which maintain electrical continuity when a gate is closed actually make contact. The installer selects the more suitable type of contact depending upon the particulars of any given pair of switching contacts.

In addition to providing switching contacts to assure making and breaking of the electrical circuit at gates, the novel apparatus may be called on to support the weight of an exposed electrical conductor without imposing this weight on the contacts. Such weight, if imposed on contacts, would potentially inhibit the contacts from moving as intended along their paths of motion. In order to provide a suitable support for weight, a conductor mount may also bear a projecting support or tower. The tower enables the installer to tie off an exposed filamentary conductor so that its weight is not imposed on the movable contact.

There are a number of configurations of conductor mounts which may be selected. Selection is based on cross sectional configuration of a fence post or gate post to which the conductor mount is to be fastened. One configuration is arcuate, so that it generally conforms to fence posts which are circular in cross section along their length. Other configurations include planar base panels. A conductor mount which includes planar base panels may have a single planar base panel, two planar base panels hinged to one another, or three planar base panels hinged to one another. Conductor mounts including planar base panels are advantageously used with fence posts which are square or rectangular in cross section along their length, as the planar base panels seat flush against flat fence post surfaces. It is also possible to utilize conductor mounts having planar base panels for use with irregularly configured fence posts, such as split rail fence posts.

In summary, an installer may select among a variety of mounting configurations to best fasten to any given fence or gate post. The installer may further select either one of two contact motion options to assure meeting of opposed contacts at switch points at gates or other places where electrical continuity is to be broken and reestablished.

According to another aspect of the invention, using the novel conductor mounts, a two pole break situation may be established at gates. That portion of the exposed filamentary conductor which extends along a gate is fully de-energized when the gate is opened. Closing of the gate automatically reestablishes electrical continuity both at the gate and of course along the rest of the fence.

BRIEF DESCRIPTION OF THE DRAWINGS

FIGS. 11A through 11C show a Table of reference numerals.

Similar reference characters denote corresponding features consistently throughout the attached drawings.

DETAILED DESCRIPTION OF THE PREFERRED EMBODIMENTS

The present invention is directed to a live conductor mounting arrangement for mounting exposed electrically energized filamentary electrical conductors on posts of existing fences so that the fence may be converted to an electrified fence. More specifically, the present invention sets forth conductor supporting apparatus which not only enables ready mounting, but which also incorporates electrical contacts having characteristics which accommodate fences of varying sizes and distances between posts and minor misalignments of electrical contacts. It should be understood at the outset that designation of a fence as "electrified" signifies fences of the type provided with exposed conductors for imparting electric shocks to animals, and not only fences which are actually in an electrically energized condition. Similarly, as the term "electrified" is applied to conductors utilized to carry energizing electrical fields, a permanent or constant energized state is not implied.

Figure 1:
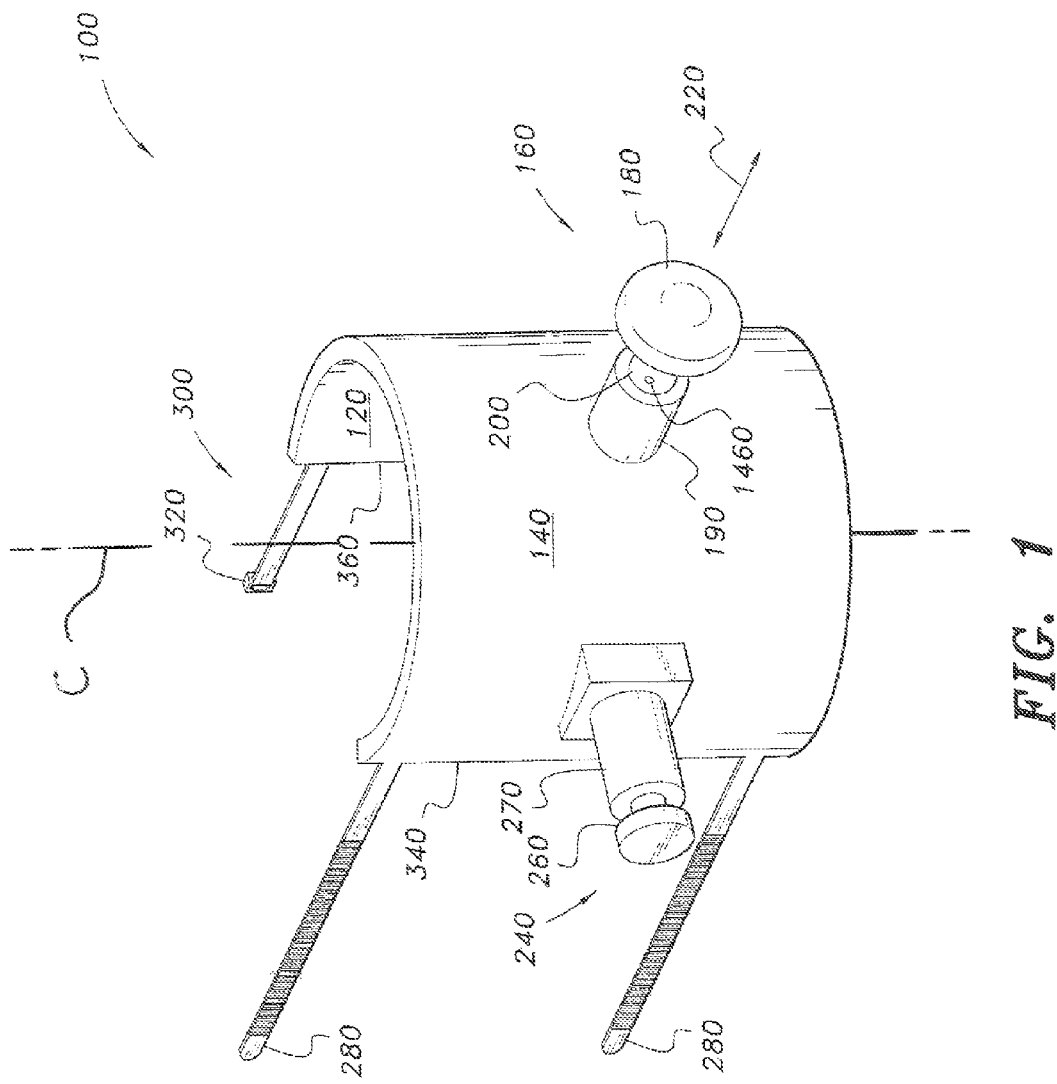
FIG. 1 is a perspective view of a first configuration of a live conductor mounting, according to at least one aspect of the invention.

The invention is best understood by first considering four basic conductor mountings. Turning first to FIG. 1, there is shown an electrically insulated collar 100 which is configured to partially encircle one of the posts of a fence, as further shown hereinafter. The collar 100 is disposed to close adjustably over the post, and defines an inside surface 120 which is disposed to face the post when the collar 100 partially encircles the post, and an outside surface 140 facing away from the post when the collar 100 partially encircles the post. The collar 100 comprises at least one integral fastener for completing encirclement of and engaging one of the posts of the fence. The fastener may comprise elements of ratchet action cable ties of the type which are widely used to bundle electrical cables. When fastened, the fasteners are disposed to cause collar 100 to securely engage the post of the fence for example by constricting over the post. The collar 100 may comprise fasteners such as comprise fasteners 280, 300 each having a flexible arm which may be a male arm bearing ribs, or alternatively, a socket or head 320 which resists withdrawal by ratchet engagement of the ribs of the male arm once the male arm has been inserted thereinto. The fastener 280 comprises a ribbed stem which is engaged by ratchet action within the head 320 of the fastener 300.

The fasteners 280, 300 may be joined or fixed to the body of the collar 100 in any suitable way, such as by embedding in the constituent material of the collar 100, sonic or ultrasonic welding, forming a retaining loop (not shown) through which the slender body of the respective fastener 280 or 300 is passed, or in any other suitable way.

The collar 100 comprises at least one electrically conductive contact 160 which is disposed on the outside 140 of the collar 100, and is movably mounted on the collar 100 so as to accommodate minor misalignments with another electrically conductive contact. In the example of FIG. 1, the enlarged head 180 of the electrically conductive contact 160, which as depicted bears a curved contact surface, the curved contact surface defining a dome, is constrained to move in a direction of travel which is substantially oriented to pass through a theoretical center line C of the post of the fence to which the collar 100 will be mounted. The center line C when the collar 100 is in the orientation shown in FIG. 1, which would be similar to the orientation in which the collar 100 would be installed to a vertical fence post such as the fence post 1180 shown in FIG. 9. The center line C may also be regarded as the center line of the collar 100. Constraint of travel of the electrically conductive contact 160 is accomplished by mounting the shaft 200 of the electrically conductive contact 160 within a contact support tower 190 which is disposed to support and guide the electrically conductive contact 160 to move linearly along the direction of travel. The direction of travel of the electrically conductive contact 160 is indicated by an arrow 220, and may coincide with the longitudinal axis of the shaft 200.

The collar 100 may also comprise at least one conductor tower 240 projecting to the outside 140 from within the collar 100. The conductor tower 240 may comprise a conductor engagement structure such as a circumferential groove 260 which is disposed to engage a filamentary conductor (not shown) so as to secure the filamentary conductor to the conductor tower 240. For filamentary conductors such as a sixteen gauge wire, the filamentary conductor may be wound around the shaft 270 of the conductor tower 240 and retained within the groove 260 formed therein.

Figure 9:
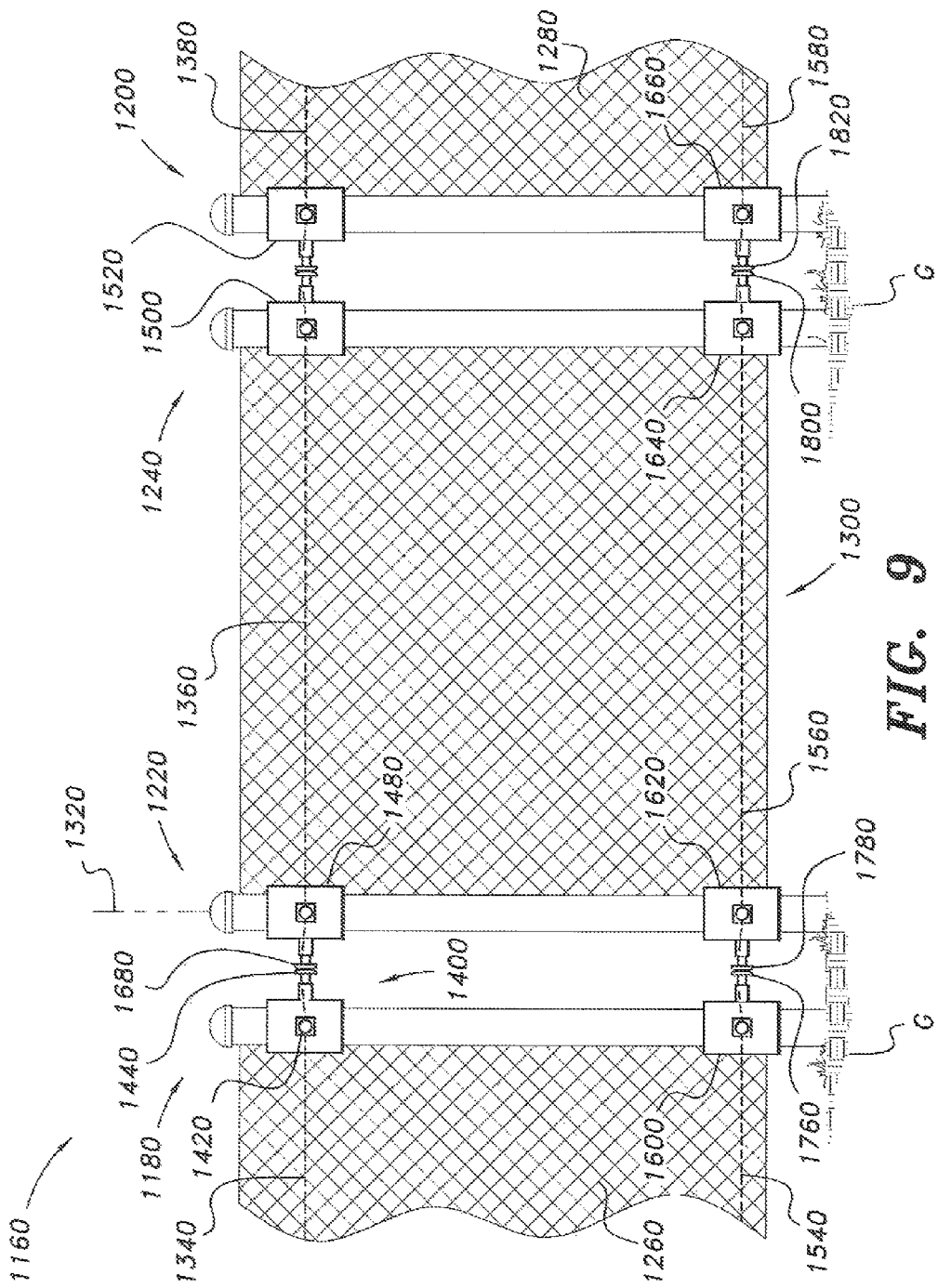
FIG. 9 is an environmental side elevational view of an electrified fence which incorporates plural examples of the component of FIG. 1.

It will be seen that the conductor tower 240 is angularly spaced apart from the electrically conductive contact 160 when the collar 100 is mounted on the post of the fence (see for example FIG. 9). Visible even in the perspective view of FIG. 1, it may be seen that the angle of displacement of the conductor tower 240 from the electrically conductive contact 160 may be a perpendicular angle.

The collar 100 is mildly flexible and is generally arcuate along its length, where the length is that dimension extending from a first edge 340 to an opposed second edge 360, as depicted in FIG. 1. Flexibility and arcuate configuration enable the collar 100 to adjustably conform to fence posts which are circular in cross section.

Fences are conventionally constructed using posts which may be circular in cross section, such as of steel tubes, or which may be irregular, rectangular or square in cross section. These constructions are typical of round post fences, rancher's fences, field fences, and of precut lumber. Precut lumber may be of nominal dimensions of four inches by four inches, for example. The collar 100 of FIG. 1 is suitable for service with posts of circular cross section. To accommodate fence posts which are rectangular, the present invention provides a comparable collar 400, which is functionally similar to the collar 100, but which is adapted to accommodate fence posts of rectangular cross sectional configuration.

Figure 2:
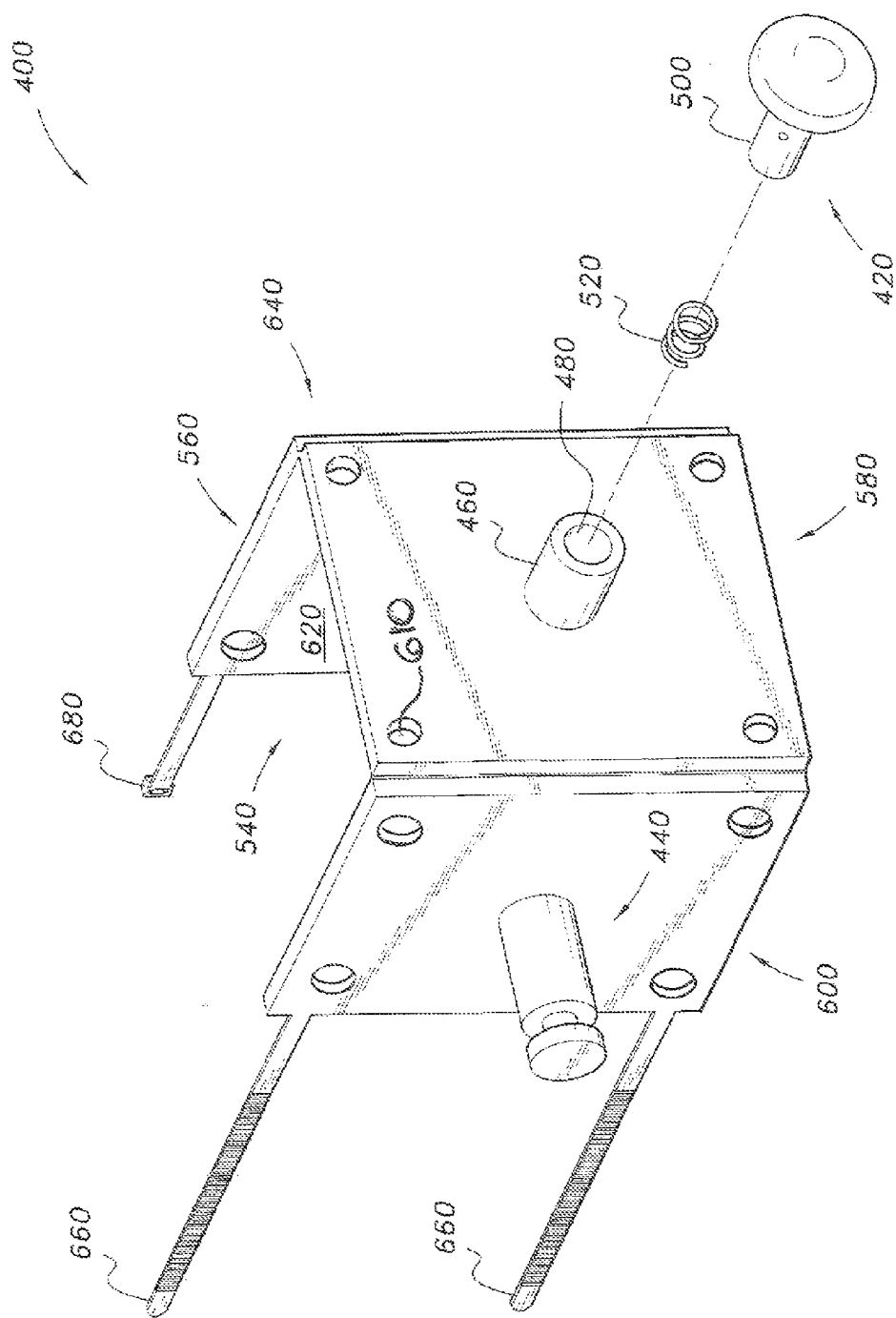
FIG. 2 is a perspective view of a second configuration of a live conductor mounting, according to at least one aspect of the invention.

FIG. 2 shows the collar 400. Because the collar 400 is functionally the equivalent of the collar 100 apart from accommodating rectangular fence posts, the collar 400 may have an electrically conductive contact 420 which may be structurally and functionally equivalent to the electrically conductive contact 160, and a conductor tower 440 which may be structurally and functionally equivalent to the conductor tower 240. The electrically conductive contact 420 may be supported within a contact support tower 460 which may be the structural and functional equivalent of the contact support tower 190, having a central bore 480 extending therethrough for receiving and guiding the shaft 500 of the electrically conductive contact 420. A coil spring 520 may be disposed within the bore 480, the coil spring 520 therefore being contained within said contact support tower.

The coil spring 520 may be disposed to urge the electrically conductive contact 420 in a predetermined direction, such as outwardly, away from the contact support tower 460 and away from the inside 540 of the collar 400. This promotes contact with a corresponding associated contact (as will be described hereinafter) even where there is minor misalignment or slightly excessive spacing of the corresponding associated contact. Although not shown, the collar 400 will include suitable structure for retaining the electrically conductive contact 420 within the bore 480, thereby preventing escape of the electrically conductive contact 420.

The feature which makes the collar 400 suitable for use with fence posts of rectangular cross sectional configuration is then unlike the collar 100 which has an arcuate inside 120, the inside 540 of the collar 400 comprises plural flat, straight sections, such as the sections 560, 580, and 600. Each section 560, 580, or 600 has a flat or planar interior surface, such as the flat or planar interior surface 620 of the section 560. Each one of the flat sections 560, 580, or 600 is joined to an adjacent flat section 560, 580, or 600 by a pivotal joint such as the live hinge 640. The collar 400 may be fabricated by injection molding using a synthetic resin, for example, so that thin strips of synthetic resin may provide flexible joints such as the live hinge 640.

The collar 400 may have fasteners such as the tie cable ends 660, 680. Each one of the tie cable ends 660, 680 may have one end of a conventional cable tie in a manner similar to that of the fasteners 280, 300 of FIG. 1.

The collar 400 may also have holes formed in its flat panels, such as the sections 560, 580, and 600, for receiving fasteners, such as screws, bolts, and nails (none shown), which may be driven into plastic and wooden fence posts to facilitate mounting the collar 400 to a fence post. One hole 610 is called out by reference numeral. The hole 610 passes entirely through the section 580 of the collar 400. However, it will be appreciated that each flat panel, such as the sections 560, 580, 600 in the embodiment of FIG. 2, and any corresponding flat panels of other embodiments, may have a plurality of holes, such as having one hole at each corner of each flat panel as depicted in FIG. 2.

Figure 3:
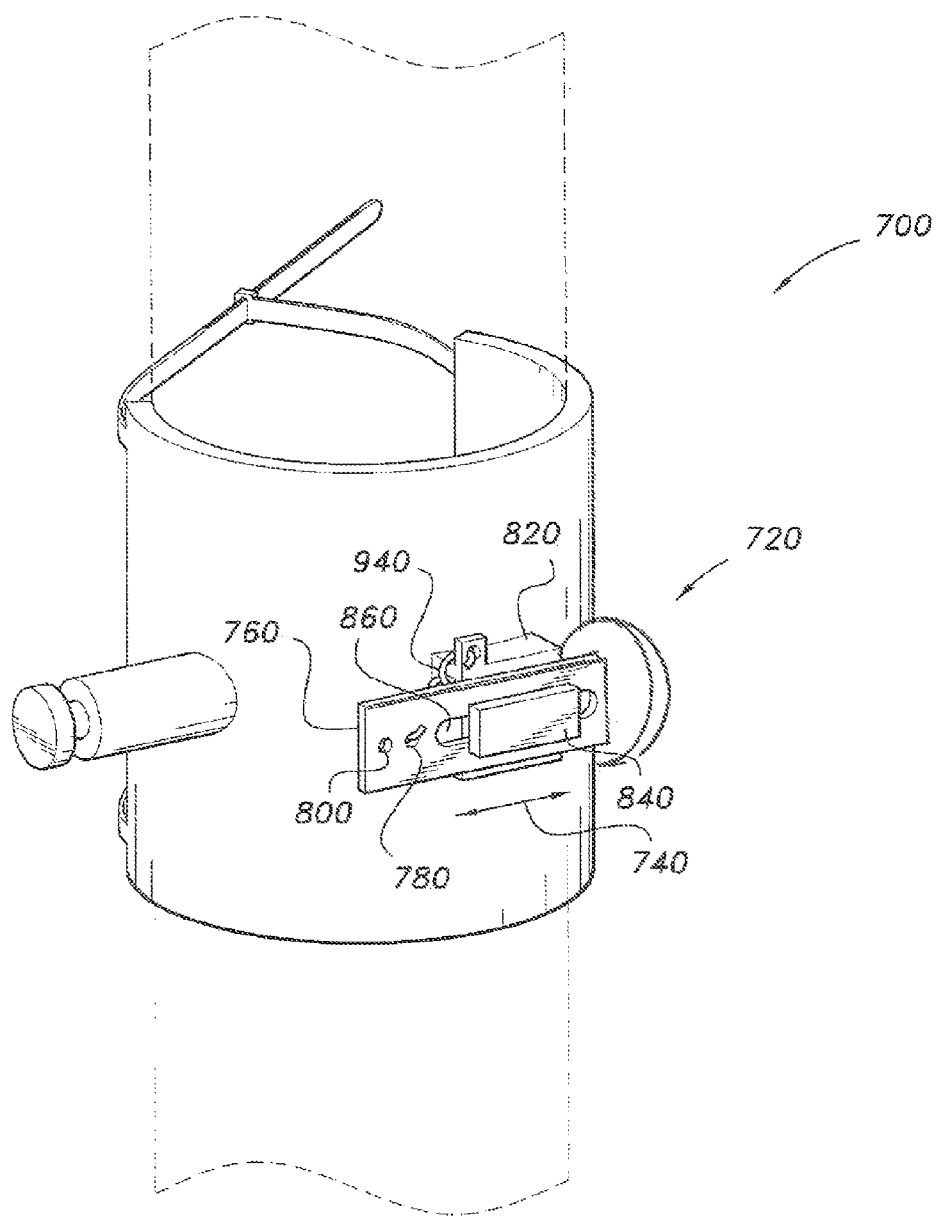
FIG. 3 is a perspective view of a third configuration of a live conductor mounting, according to at least one aspect of the invention.

FIG. 3 shows a collar 700 which may be the functional and structural equivalent of the collar 100, except that an electrically conductive contact 720 provided as part of the collar 700 is arranged to move in an orthogonal direction of travel (indicated by an arrow 740) which is perpendicular relative to the direction of travel seen as the arrow 220 of the electrically conductive contact 160 of the collar 100.

The electrically conductive contact 720 may comprise an elongated tab 760 bearing a first hole 780 for seating a spring (see FIG. 5) and a second hole 800 for engaging a filamentary electrical conductor (described hereinafter). The electrically conductive contact 720 may be mounted to the collar 700 in the following way. A base 820 affixed to the collar 700 may support a retention head 840 connected to the base 820 by a neck (not visible in FIG. 3, but of cross sectional area less than that of the retention head 840 so as to fit within a slot 860 formed in the tab 760). The tab 760 may be slidably entrapped between the base 820 and the retention head 840, and constrained to move in the direction of travel (as indicated by the arrow 740) within limits imposed by dimensions of the slot 860 and the neck of the retention head 840.

Figure 4:
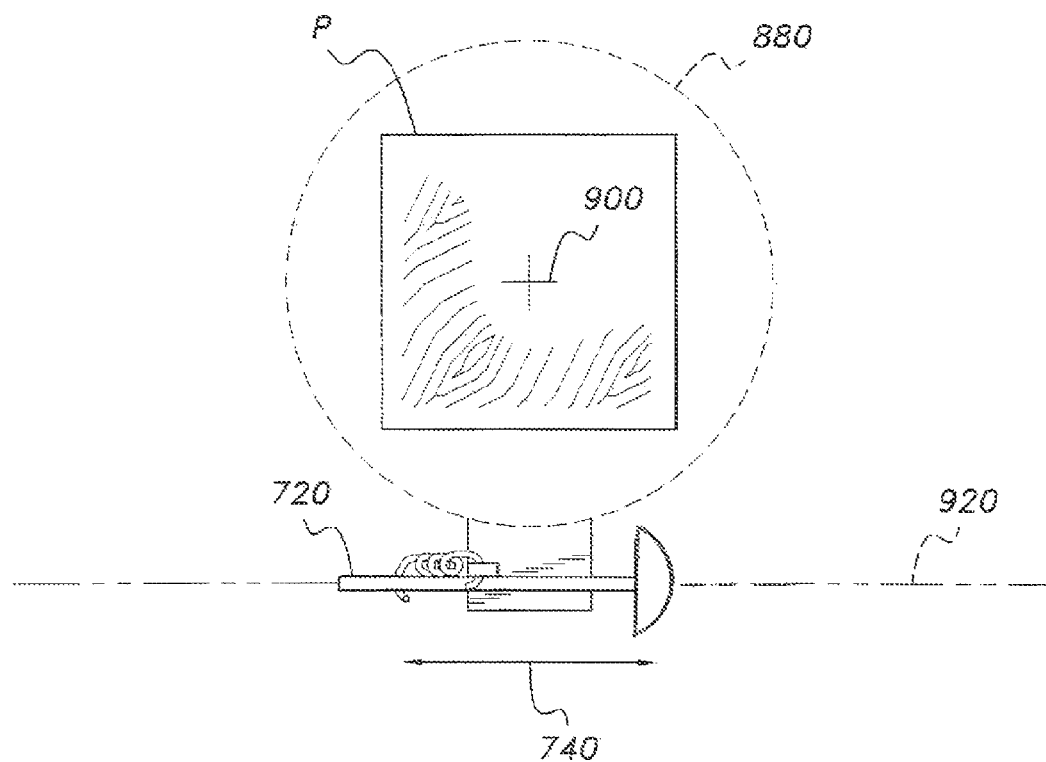
FIG. 4 is a diagrammatic environmental top plan view showing a spatial interrelationship of a component shown in FIG. 3 to its environment.

This motion is also depicted diagrammatically in FIG. 4, wherein it may be seen that the direction of travel (indicated by the arrow 740) is substantially tangential to a circle 880 the center 900 of which is coincident with the center line of the post P of the fence (not shown in its entirety in FIG. 4) to which the collar 700 is mounted. Tangential contact of the circle 880 is made by the longitudinal center line 920 of the electrically conductive contact 720.

Figure 5:
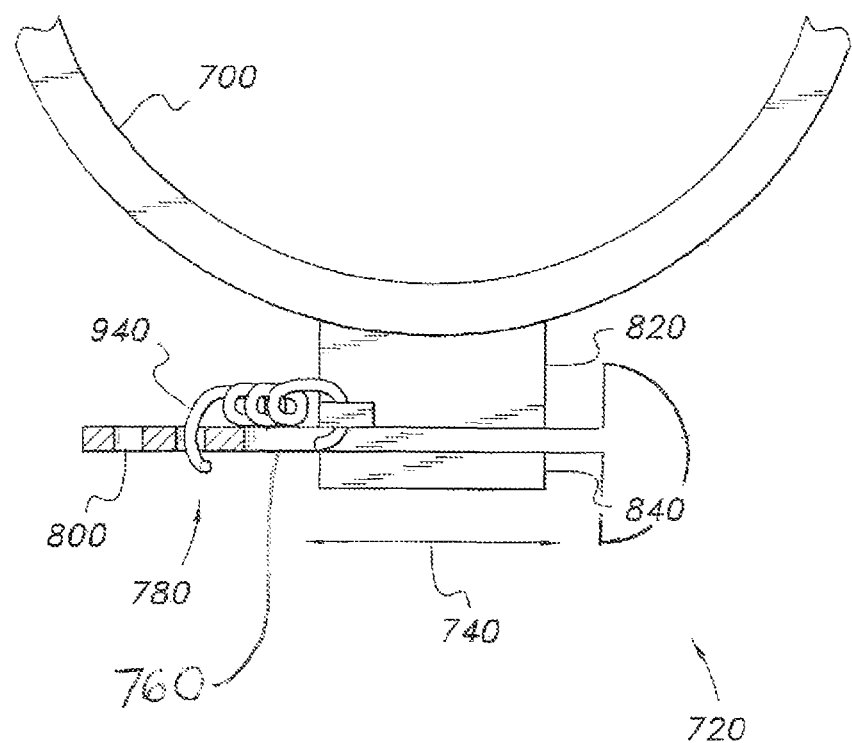
FIG. 5 is a top plan detail view of components shown at the lower right side of FIG. 3, shown to enlarged scale.

FIG. 5 shows details of engagement of the electrically conductive contact 720 with its associated collar 700. The spring 940 engages the first hole 780 formed in the tab 760 at a distal end of the spring 940, and at the proximal end is suitably anchored to the collar 700, either at the body thereof or at the base 820.

Figure 6:
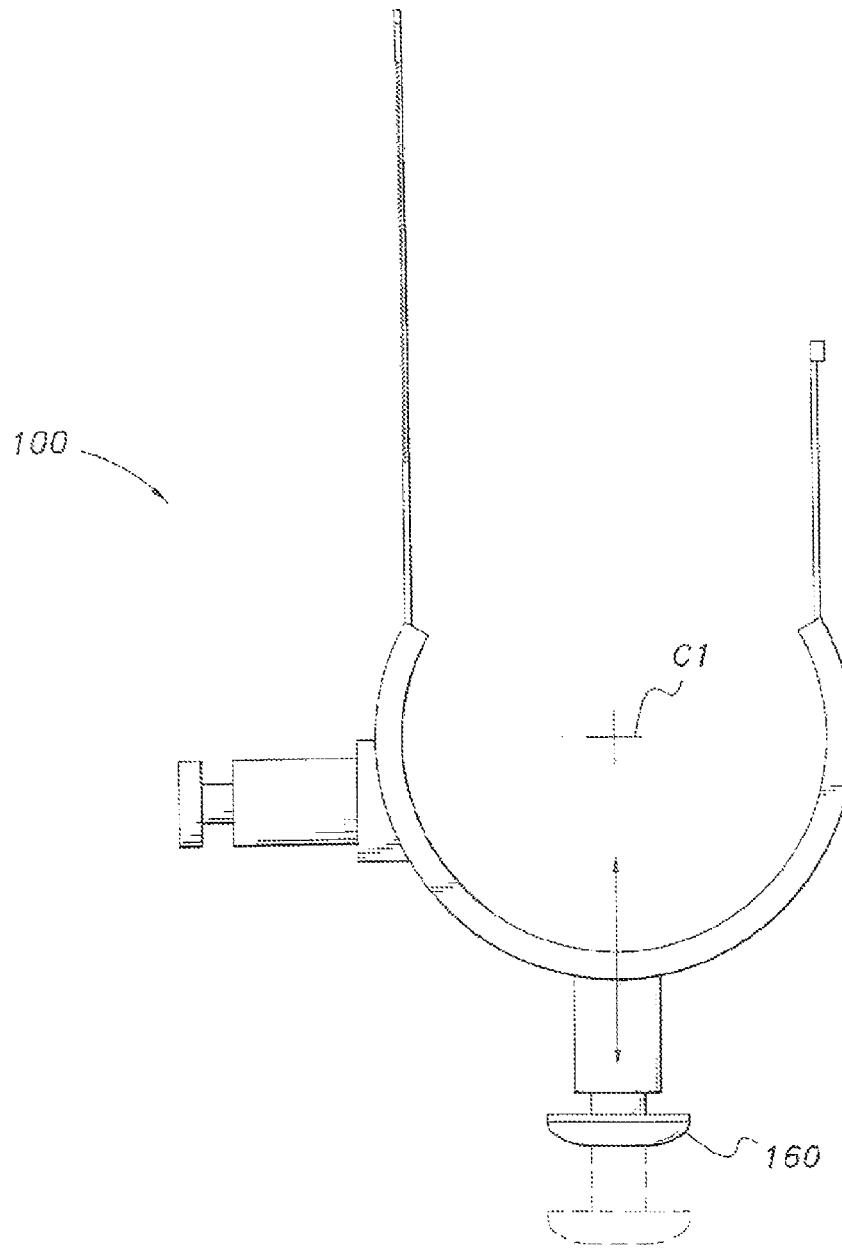
FIG. 6 is a top plan detail view of the lower right side of FIG. 1.
Figure 7:
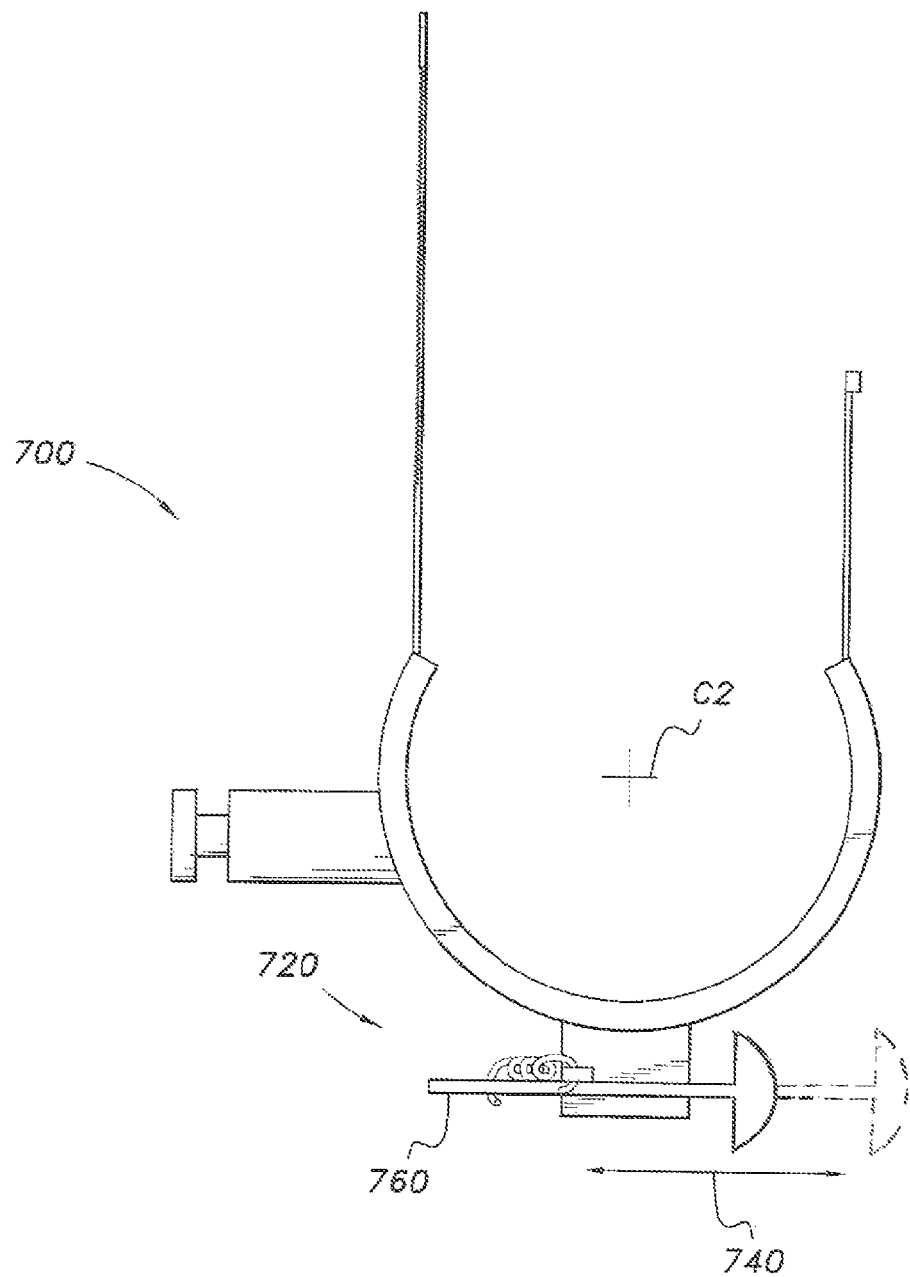
FIG. 7 is a top plan detail view corresponding to FIG. 7, but showing components taken from FIG. 3.

FIGS. 6 and 7 graphically illustrate contrast between respective directions of travel of the electrically conductive contact 160 (as indicated by the arrow 220) and of the electrically conductive contact 720 (as indicated by the arrow 740). The two directions of travel may be compared as to their relationships with the centers C1, C2 of the posts (not shown) to which the collars 100, 700 are respectively mounted.

Just as the collar 100, which is adapted for use with circular fence posts, has an analogous counterpart adapted for use with rectangular fence posts, as seen with the collar 400 of FIG. 2, so does the collar 700 have an analogous counterpart adapted for use with rectangular fence posts.

Figure 8:
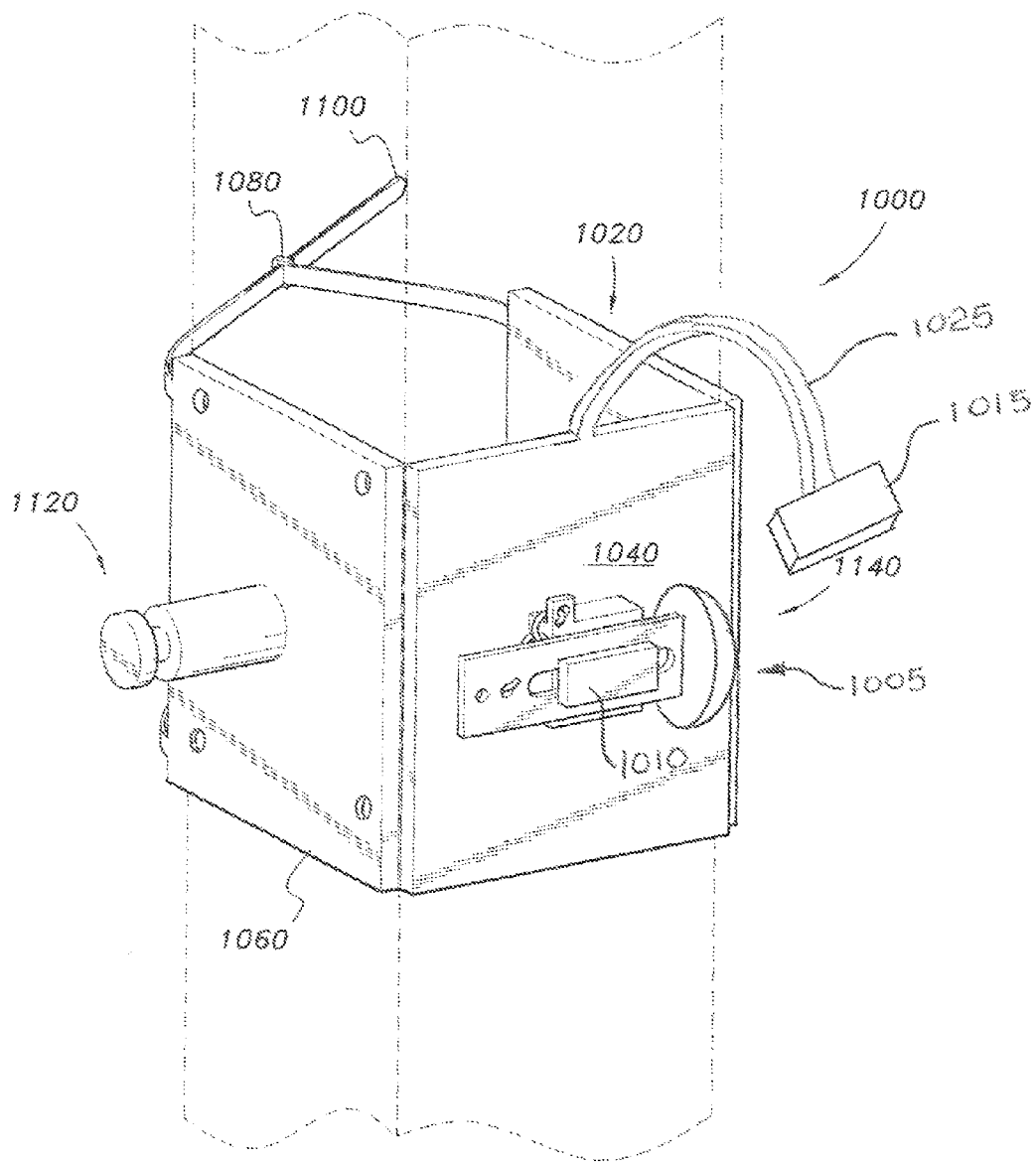
FIG. 8 is a perspective view of a fourth configuration of a live conductor mounting, according to at least one aspect of the invention.

Referring now to FIG. 8, a collar 1000 is seen to comprise a body (which is that part of the collar 1000 which engages a fence post) which in turn comprises plural sections 1020, 1040, 1060, just as the body of the collar 400 has sections 560, 580, 600. The collar 1000 may at its body be the structural and functional equivalent of the collar 400, and in its engagement with filamentary electrical conductors, may be the structural and functional equivalent of the collar 100.

The sections 1020, 1040, and 1060 may be joined by live hinges in the same way that the sections 560, 580, and 600 are mutually joined. The collar 1000 may have fasteners 1080, 1100 which may be similar to the fasteners 280, 300 of FIG. 1.

The collar 1000 may comprise a conductor tower 1120 which may be for example a structural and functional equivalent of the conductor tower 240 of FIG. 1. The collar 1000 may comprise an electrically conductive contact 1140 which may be the structural and functional equivalent of the electrically conductive contact 720 of FIG. 3, including all mounting structure.

The collars 100, 400, 700, and 1000 may be provided and utilized in any number and combination as may be required for any particular installation. Important variables in any particular installation that are addressed by the collars 100, 400, 700, and 1000 include but are not limited to the cross sectional configuration of fence posts, and also issues of proximity and alignment, as these characteristics affect contact and engagement of associated pairs of contacts, such as the electrically conductive contacts 160, 420, 720, and 1140.

FIG. 8 also shows a feature of the collar 1000 which may be provided for assuring that the contact 1005 not slip past a retention head 1010 and be inadvertently lost. A retainer 1015 held on a flexible tether 1025 may engage the retention head 1010 in any suitable way, such as by snap fit. Although the retainer 1015 and its flexible tether 1025 are shown only for the collar 1000, it will be understood that any other comparable collar of the present invention may be provided with a similar feature.

The above examples of collars, such as the collar 100, provide a basic understanding but do not limit varieties of collars which may be provided according to the present invention. For example, collars may be provided with conductor towers such as the conductor tower 240 in locations other than those depicted, and further may be provided with more than one conductor tower. For example, two conductor towers may be provided at angular spacing of one hundred eighty degrees, so that there is a conductor tower on each side of a collar. Locations and numbers of contacts such as the electrically conductive contact 160 may similarly be varied.

Figure 10:
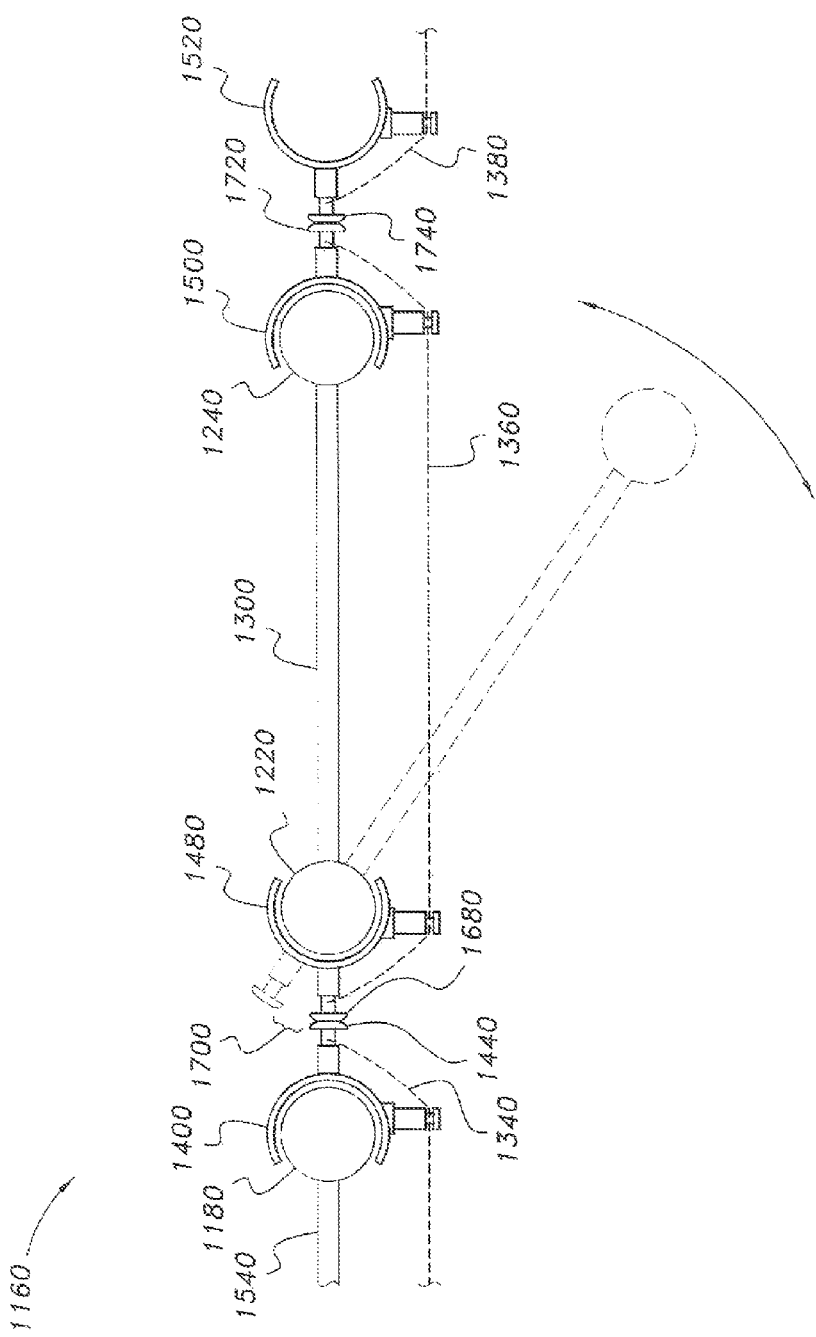
FIG. 10 is a top plan view of FIG. 9, depicted diagrammatically for visual clarity.

An exemplary installation is shown in FIGS. 9 and 10, wherein a chain link fence 1160 is depicted. The chain link fence 1160 comprises a plurality of fence posts 1180, 1200, gate posts 1220, 1240, barrier elements 1260, 1280, and a gate 1300. A barrier element such as the barrier elements 1260, 1280 will be understood to refer to permanent barriers of their associated fence, as contrasted with a gate, which gate can open to provide passage through the associated fence. Barrier elements such as the barrier elements 1260, 1280 are supported by fence posts such as the fence posts 1180 and 1200 such that the chain link fence 1160 is supported on the ground G. Typically, a barrier element spans two fence posts so as to be supported at two opposed ends of the barrier element, although other arrangements are possible.

The fence posts 1180, 1200 and the gate posts 1220, 1240 are vertically oriented, this being determined by orientation of their respective longitudinal axes. An exemplary longitudinal axis 1320 is called out for the gate post 1220, the remaining gate post 1240 and the fence posts 1180, 1200 having similar respective axes not explicitly called out.

The chain link fence 1160 may be conventional, and may include hinges (not shown) for pivotally mounting the gate 1300, a latch (not shown), and other conventional features (none shown). It should be mentioned here that although reference is made to pivotal mounting of the gate 1300, the inventive principles may apply to gates which are elevated vertically to open, gates which are entirely removed from their respective fences, gates which are pivoted about a horizontal axis, and other arrangements for opening a gate (none of these options is shown). Therefore, reference to mounting of a gate to its associated fence does not necessarily imply structure affixing the gate to any portion of the fence. For example, a gate (not shown) could be leaned against the permanent portions of the fence and lifted away to afford passage. It will be understood that for the purposes of the present invention, a gate such as the gate 1300 is mounted to other portions of the fence, such as the chain link fence 1160.

As described thus far, the chain link fence 1160 is not electrified. The chain link fence 1160 as depicted has been converted to an electrified fence by installation of certain novel components and exposed filamentary conductors. The installation shown in FIG. 9 provides a first electrified line located at a relatively high location on the chain link fence 1160 and a second electrified line located at a relatively low or alternatively stated, vertically spaced apart location on the chain link fence 1160. The electrified line at the high location may for example serve to deter large animals such as livestock from attempting to contact the chain link fence 1160. The electrified line at the low location may serve to deter smaller animals, particularly predators such as snakes, foxes, and others, from burrowing beneath the chain link fence 1160.

The first electrified line may comprise an exposed filamentary conductor 1340 mounted to and extend along the upper bounds of the barrier element 1260, and may extend generally horizontally the length of the barrier element 1260. An exposed filamentary conductor 1360 may be mounted to and extend along the gate 1300 in general horizontal alignment with the exposed filamentary conductor 1340. An exposed filamentary conductor 1380 may be mounted to and extend along the barrier element 1280 in general horizontal alignment with the exposed filamentary conductors 1340 and 1360.

Although described as horizontal herein, the path of any exposed filamentary conductor, such as the exposed filamentary conductors 1340, 1360, 1380, may be varied to suit different fence and gate configurations and other conditions.

The exposed filamentary conductor 1340 may be supported at one end by a collar 1400 and elsewhere along the barrier element 1260 by conventional apparatus. The exposed filamentary conductor 1340 may be wound around a conductor tower 1420 of the collar 1400 and may be terminated or tied off at an electrically conductive contact 1440 of the collar 1400 using a hole extending through the electrically conductive contact 1440. The collar 1400 may be similar to the collar 100 of FIG. 1, which shows a suitable hole 1460 for tying off or terminating a filamentary conductor such as the exposed filamentary conductor 1340. It may be said here that any electrically conductive contact of any collar of those presented herein may have a corresponding hole for terminating conductors.

The exposed filamentary conductors 1360 and 1380 may similarly be supported by and terminated at corresponding collars 1480, 1500, and 1520. These collars 1400, 1480, 1500, and 1520 are each mounted to the gate 1300 or to one of the barrier elements 1260 or 1280 by connection to one of the fence posts 1180, 1200 or to one of the gate posts 1220, 1240.

The collars 1480, 1500, 1520 may be functionally and structurally similar or identical to the collar 100, although modified as to provision of an additional conductor tower such as the conductor tower 240 (see FIG. 1) or variation of location of such a conductor tower.

The second electrified line, which as depicted comprises respective exposed filamentary conductors 1540, 1560, 1580, may be supported on the chain link fence 1160 in a manner similar to that of the first electrified line, for example utilizing additional collars 1600, 1620, 1640, 1660, any of which may be similar to the collar 100 or variants thereof as described.

The various collars described with respect to the installation of FIG. 9 collectively form a switching arrangement disposed to fully de-energize that portion of the electrified line, such as the exposed filamentary conductor 1360, extending along the gate 1300. This switching arrangement is disposed to break electrical continuity of the exposed filamentary conductor 1360 at two spaced apart points along the length thereof. These two spaced apart points are of course the right and left ends of the exposed filamentary conductor 1360. The consequence of such breakage of electrical continuity is that the entire exposed filamentary conductor 1360 is entirely isolated from operating voltage of the electrified fence, and hence is rendered safe for people to contact.

The switching arrangement described above includes pairs of electrically conductive contacts such as the electrically conductive contact 1440. An opposed electrically conductive contact 1680 completes the contact pair necessary for completing and breaking the circuitry established by the exposed filamentary conductors 1340, 1360. As better seen in FIG. 10, the collars 1400, 1480 and their respective electrically conductive contacts 1440, 1680 are in physical contact and electrical continuity with one another when the gate 1300 is closed, and are out of physical contact and electrical continuity when the gate 1300 is open. The condition wherein the gate 1300 is closed is shown in solid lines in FIG. 10. An alternative condition wherein the gate 1300 is open is shown in broken lines. It will be seen that when the gate 1300 is open, the electrically conductive contact 1680 moves to a location wherein a gap 1700 is established between the electrically conductive contacts 1440 and 1680. Physical contact and electrical continuity will be re-established upon closing the gate 1300. Bearing in mind that similar switching action occurs with the electrically conductive contacts 1720, 1740 of respective collars 1500, 1520, it becomes apparent that the act of opening the gate 1300 automatically creates a double pole break condition which entirely de-energizes the exposed filamentary conductor 1360 along the full span of the gate 1300.

In the example of FIGS. 9 and 10, not only do the respective first, second, third, and fourth electrically conductive contacts 1440, 1680, 1720, 1740 act to isolate the exposed filamentary conductor 1360 when the gate 1300 is opened, but respective fifth, sixth, seventh, and eighth electrically conductive contacts 1760, 1780, 1800, 1820 of the collars 1600, 1620, 1640, 1660 perform a similar function with respect to the 1560, notably establishing a double pole break condition which entirely de-energizes the exposed filamentary conductor 1560 along the length of the gate 1300.

In FIG. 10, some components of the respective installations have been omitted for clarity of the view, but will be understood to be present. Illustratively, the fasteners such as the fasteners 280, 300 (see FIG. 1) have been omitted. Also, certain distortions have been introduced for clarity of the view. Notably, in FIG. 10, the collars 1400, 1480, 1500 are not shown in contact with their respective fence post 1180 and gate posts 1220, 1240, although when actually installed, such contact would indeed occur. Again, this is for visual clarity of the view.

Despite separation of these components in the depiction of FIG. 10, it will be apparent that the respective collars 1400, 1480, 1500, and 1520 may adjustably conform to and close over in cooperation with the respective fence post 1180 and gate posts 1220, 1240.

The invention may be thought of as a set of components for mounting an electrically energized filamentary conductor on a fence comprising vertical fence posts and intended to be converted to an electrified fence using the set of components. The components of the set may be any one of the conductor mounts described herein. It will further be appreciated that the components described herein may be provided in many variations, such as right and left handed versions, may have any desired number and style of contacts such as the contact 160 and wire supports such as the conductor tower 240, and any number of panels such as the sections 560, 580, 600.

It should be understood that items described herein in the singular may be provided in the plural. For example, "a barrier", "a gate", and the like signify at least one of the referenced items, and explicitly contemplates both one and also more than one. The same meanings apply to the phrase "at least one".

Each barrier element such as the barrier element 1260 of FIG. 9 may share a fence post such as the fence post 1180 with an adjacent barrier element, or alternatively, a barrier element may have its own dedicated fence post (or of course both).

It is to be understood that the present invention is not limited to the embodiments described above, but encompasses any and all embodiments within the scope of the following claims.

What is claimed:

1. An electrified fence comprising:
a plurality of vertically oriented fence posts;
a barrier element supported by at least one said fence post;
a gate mounted between two fence posts, said gate having a left side and a right side;
at least one exposed filamentary conductor mounted to and extending along said barrier element and said gate; and
a switching arrangement disposed to fully de-energize that portion of said exposed filamentary conductor extending along said gate responsively to said gate being moved to an open position, wherein said switching arrangement is disposed to break electrical continuity of said exposed filamentary conductor at two spaced apart points to electrically isolate said gate when said gate is in an open position,
wherein said switching arrangement comprises first, second, third and fourth collars respectively mounted to a first fence post, left side of said gate, right side of said gate, and a second fence post,
wherein a conductor tower is disposed on the outside surface of each of said collars to secure a filamentary conductor,
wherein each of said collars define a length, an outside surface and an inside surface,
wherein each of said collars is generally arcuate along its length which in combination with a fastening means enables each of said collars to be mounted around a post having a circular cross-section,
wherein an electrically conductive contact is disposed on the outside surface of each of said collars,
wherein each of said electrically conductive contacts is supported by a contact support tower disposed on said outside surface,
wherein each of said electrically conductive contacts comprises a shaft, said shaft terminating in a head, said contact support tower having a central bore for receiving and guiding said shaft, wherein said electrically conductive contact is biased by a spring in an outward direction with respect to said outside surface, said spring being located in said central bore,
wherein when said gate is in a closed position said electrically conductive contacts of said first and second collars are in direct contact, and said electrically conductive contacts of said third and fourth collars are in direct contact, and
wherein when said gate is in an open position said electrically conductive contacts of said first and second collars are not in contact, and said electrically conductive contacts of said third and fourth collars are not in contact.

2. The electrified fence according to claim 1,
wherein each of said heads have a curved contact surface.

3. The electrified fence according to claim 2,
wherein each of said springs is a coiled spring.

4. An electrified fence comprising:
a plurality of vertically oriented fence posts;
a barrier element supported by at least one said fence post;
a gate mounted between two fence posts, said gate having a left side and a right side;
at least one exposed filamentary conductor mounted to and extending along said barrier element and said gate; and
a switching arrangement disposed to fully de-energize that portion of said exposed filamentary conductor extending along said gate responsively to said gate being moved to an open position, wherein said switching arrangement is disposed to break electrical continuity of said exposed filamentary conductor at two spaced apart to electrically isolate said gate when said gate is in an open position, wherein said switching arrangement comprises first, second, third and fourth collars respectively mounted to a first fence post, left side of said gate, right side of said gate, and a second fence post, wherein a conductor tower is disposed on the outside surface of each of said collars to secure a filamentary conductor, wherein each of said collars define a length, an outside surface and an inside surface, wherein each of said collars is generally arcuate along its length which in combination with a fastening means enables each of said collars to be mounted around a post having a circular cross-section, wherein an electrically conductive contact is disposed on the outside surface of each of said collars, wherein each of said electrically conductive contacts is supported by a contact support tower disposed on said outside surface, and wherein each of said electrically conductive contacts comprises a shaft, said shaft terminating in a head, said electrically conductive contact is biased in an outward direction with respect to said outside surface.

\* \* \* \* \*